MONITORING APPARATUS EMPLOYING MAGNETIC SENSING DEVICES

Filed Jan. 27, 1966 2 Sheets-Sheet 1

INVENTOR.
JOHN G. VAN BOSSE
BY
AGENT

INVENTOR.

JOHN G. VAN BOSSE

BY

AGENT

United States Patent Office 3,461,247

Patented Aug. 12, 1969

3,461,247
MONITORING APPARATUS EMPLOYING MAGNETIC SENSING DEVICES

John G. Van Bosse, Park Ridge, Ill., assignor to Automatic Electric Laboratories, Inc., Northlake, Ill., a corporation of Delaware

Filed Jan. 27, 1966. Ser. No. 523,365
Int. Cl. H04m *3/22*
U.S. Cl. 179—18 3 Claims

ABSTRACT OF THE DISCLOSURE

A sensing device for use in a line circuit system, which has a saturable magnetic element of a unitary piece of linear ferrite material with at least two mutually perpendicular pairs of apertures therein. First and second conductive loops, which thread one of the pairs of apertures are connected to a signal source and a detector circuit, respectively, to couple the signal source to the detector circuit, with the ferrite material in the vicinity of the apertures acting as the coupling medium. A third loop, connected to a circuit being monitored, is wound on the magnetic element and through the other pair of apertures so that the first and second loops are orthogonal to the third loop. Whenever current of a predetermined magnitude flows in the circuit, the element becomes saturated and the signal source and detector circuit are effectively decoupled.

This invention relates to monitoring apparatus and, more particularly, to such apparatus employing magnetic sensing devices for the supervision of telephone lines and trunks.

Apparatus for monitoring the status of telephone lines and trunks is described in U.S. Patent 3,175,042 assigned to Bell Telephone Laboratories, Inc., and issued on Mar. 23, 1965.

The apparatus includes a sensing device which consists of an elongated ferrite stick of square loop material having a pair of apertures through which are threaded two electrically conductive loops. The element is mounted within a bobbin on which is wound a multiturn control coil. The coil is connected to the telephone line under supervision.

When a current pulse is applied to one of the loops that thread the apertures, a similar pulse is induced in the other loop if the multiturn coil is not energized. If the coil is energized with sufficient current to saturate the ferromagnetic elements, the pulse induced in the second loop will be of significantly lower magnitude than when the element is not saturated. Thus, if, as a result of a subscriber lifting a handset, a current is caused to flow through and thereby energize the multiturn coil, this off-hook condition will be recognized by the absence of a pulse on the output loop when the input loop is driven with a current pulse.

The element is magnetized axially along its length as a function of the condition of the circuit being monitored. The flux path for this axial magnetization includes an external air path portion of sufficient length relative to the length of the element so as to have a demagnetizing effect on the axial magnetization of the element even though the element be of a material exhibiting stable remanent states of magnetization. But the air path portion of the flux path necessitates a fairly large number of turns for the control winding in order to produce saturation in the ferrite element.

This type of element is most advantageously used in a matrix array to provide supervision for a number of circuits and in such an array several thousand such elements are employed. In order to reduce the amount of area necessary for mounting the elements in an array, the elements are placed as close together as possible. However, the elements may not be placed immediately adjacent each other or harmful magnetic interaction might result.

Accordingly, it is an object of this invention to provide a new and improved magnetic sensing device for the supervision of telephone lines and trunks.

Another object of this invention is to provide a magnetic monitoring device which requires a low value of saturation magnetization for performing the monitoring function.

Yet another object is to provide a sensing device that employs a magnetic element for use in a matrix array having magnetic flux paths that lie substantially wholly within the element so as to minimize magnetic interactions between elements of the array.

It is a feature of the invention that an apertured core structure has a plurality of conductive loops wound thereon, certain of the loops being wound on the core in one plane and certain other loops being wound on the core structure in a plane substantially perpendicular thereto so as to set up two substantially perpendicular nonremanent flux paths, each completely closed within the core structure.

It is a more specific feature of the invention that an elongated magnetic element has a first pair of apertures disposed along the longitudinal axis of the element and a second pair of apertures disposed along a line perpendicular to the axis and that a pair of windings threaded through the apertures are effectively coupled, with the material in the vicinity of the apertures acting as the coupling medium or decoupled, with local saturation of the material in the vicinity of the apertures acting to decouple the windings.

Still another feature is the application of printed wiring techniques to provide windings through the apertures of the magnetic element.

In accordance with the above principles, a preferred embodiment of the invention shows a magnetic sensing device for monitoring telephone line circuits and having a magnetic member with control windings, a signal winding, and a sense winding threaded through apertures formed in the element. The magnetic member has at least two pairs of apertures with the first pair being located along the longitudinal axis of the element and the second pair being located along a line perpendicular to the longitudinal axis.

The signal and sense windings are both threaded through the first pair of apertures so that a signal applied to the signal winding is coupled to the sense winding with the magnetic material in the vicinity of the holes acting as the coupling medium.

The control winding is threaded through the second pair of apertures and is serially connected to the telephone line circuit being monitored.

Telephone line currents corresponding to on-hook or off-hook conditions, respectively, effectively couple or decouple the two windings, and the status of a subscriber's line loop is determined by detecting the presence or absence of a signal on the sense winding.

The invention together with its objects and its features will best be understood by referring to the following detailed description together with the accompanying drawings in which.

Figure 1:
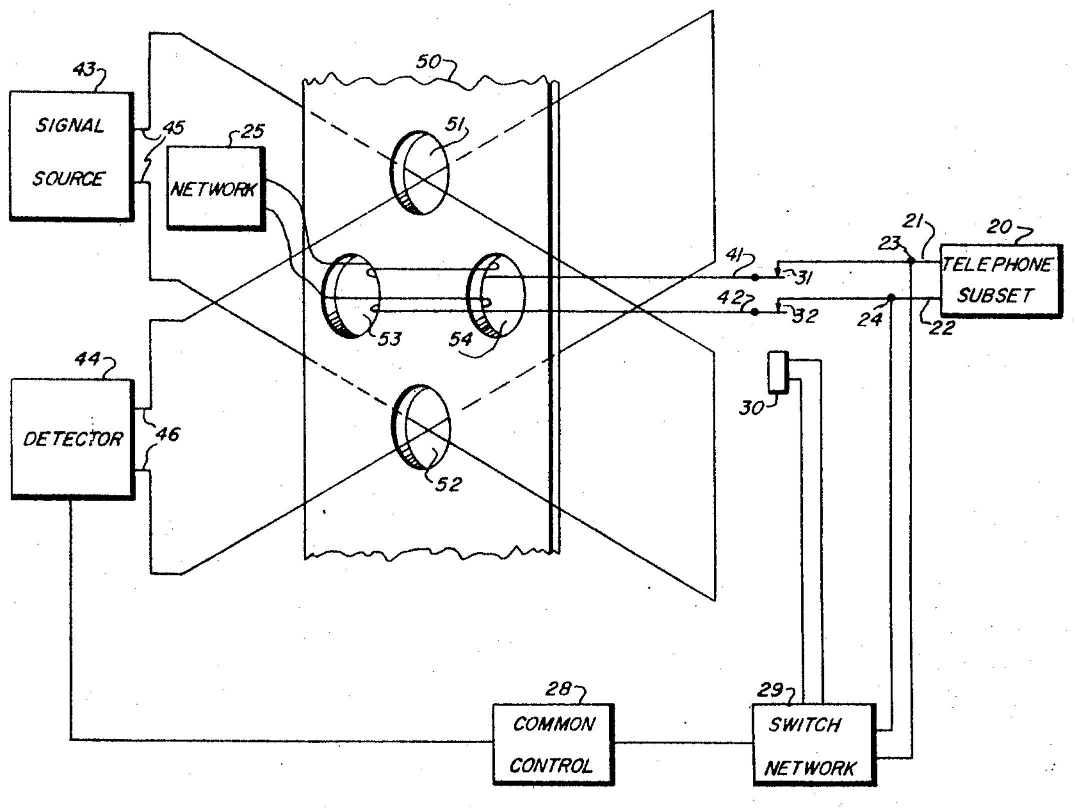
FIG. 1 is a schematic representation of a telephone line monitoring apparatus.

Referring now to the drawings, FIG. 1 is a schematic representation of monitoring apparatus for a telephone line circuit system. The monitoring apparatus consists of an element 50 having wound on it control windings, 41 and 42 which are connected to the circuit being monitored, a signal winding 45 which is connected to a signal source 43, and a sense winding 46 which is connected to a detector 44.

The element 50 is formed from a magnetic material, such as a ferrite which does not exhibit remanent switching characteristics and which does not require a provision for demagnetization. The shape of the element is not critical to operation; however, the element is preferably disc shaped or formed into an elongated strip.

Figure 3:
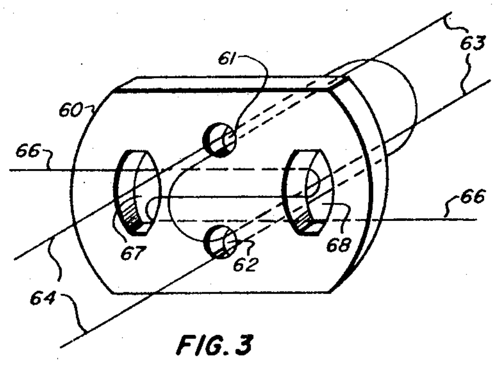
FIG. 3 shows another embodiment of the sensing element.

Four apertures 51, 52, 53, 54 have been formed in the element in a manner known in the art. For instance, they may be formed during the molding of the element prior to sintering or they may be drilled in the element after sintering. The apertures are preferably of equal diameter and spaced apart on equal centers. Other shapes may be used as indicated in FIG. 3 where two of the apertures are elongated. The important requirement is to locate the apertures close together and to provide only as much material between the aperture pairs as is required for efficient coupling of the signal and sense leads. When threaded with a signal carrying conductor, each of the apertures defines a non-remanent flux path that lies substantially wholly within the material in the vicinity of the apertures.

Two of the apertures 51 and 52 have been positioned along the longitudinal axis of the element and receive the signal winding 45 and the sense winding 46. The signal winding is threaded through both of the apertures so as to link the non-remanent flux path around the apertures and is connected to the signal source 43. The signal source is preferably a source of alternating polarity current pulses. However, inasmuch as there is no remanent switching, a source that provides unipolar current pulses may be used.

The sense winding is also threaded through apertures 51 and 52 so as to link the non-remanent flux paths around the apertures and is connected to a detector 44. The detector may be one of the conventional detecting circuits known in the art.

Inasmuch as the signal and sense windings links the same flux paths, they are coupled together with the ferrite material in the vicinity of the apertures acting as the coupling medium.

Control windings 41 and 42 are threaded through a second pair of apertures 53 and 54 which are provided along a line perpendicular to the longitudinal axis of the element. These windings are arranged so as to link the non-remanent flux paths in the material around these apertures and are serially connected to the circuit being monitored.

The signal and sense windings which are threaded through apertures 51 and 52 lie in a plane that is perpendicular to the element and to the plane of the apertures 51 and 52. The control windings which are threaded through apertures 53 and 54 lie in a second plane that is perpendicular to the element and the plane of the apertures 53 and 54 and is furthermore perpendicular to the plane which contains the signal and sense windings.

Currents in the windings that lie in the two planes will create two orthogonal flux fields. Because of the orthogonal relationship of the flux fields, there is no electromagnetic or electrostatic coupling between the control windings and the signal and sense windings; that is, there is no conventional or transformer type magnetic coupling present. A reaction to the presence of current in the control windings is coupled to the other windings only through the interaction of the orthogonal flux fields resulting in saturation of the magnetic element. Orthogonal flux fields are advantageously used to minimize the volume of magnetic material required for the sensing device and, as has been pointed out above, this is a desirable feature.

Furthermore, a magnetic sensing device which is dependent upon orthogonal flux fields provides a high signal-to-noise ratio. This characteristic is necessary when the device is used to monitor a telephone line circuit which may exhibit a wide range of current levels depending on whether the particular line circuit being monitored includes either a long or short loop of transmission line.

The amount of coupling between the signal winding and the sense winding is a function of the current present in the control windings. Whenever the current in the control windings exceeds a predetermined value, the ferrite material in the vicinity of the four apertures becomes saturated and the signal winding and sense winding become decoupled. The control windings are threaded through apertures which have been provided close to the pair of apertures that receive the signal and sense windings so that there is less ferrite material that need be saturated in order to provide the desired decoupling effect. Furthermore, the magnetic flux due to the current in the control windings will be contained mainly within the element itself and particularly in the vicinity of the apertures, so that even with a single turn control winding, the control current requirements are easily met.

Figure 2:
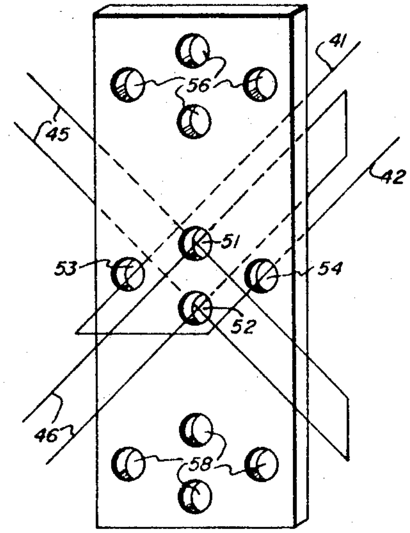
FIG. 2 shows an elongated magnetic element having provision for a plurality of sensing gates.

In actual operation, only the ferrite material in the vicinity of the apertures need be saturated and, were the elongated ferrite element to be used with a single set of apertures, a large part of the element would be inefficiently utilized. This localized saturation effect can be used advantageously to permit the provision of a number of additional sets of apertures in each single element. Thus, in FIG. 2 two additional sets of apertures, one noted generally as 56 and the other generally noted as 58, have been provided in the element. Since only one set of four apertures is used to form a complete gate circuit, it should be apparent that the device of FIG. 2 could be used to monitor simultaneously three separate circuits while providing isolation between the three circuits. The two additional circuits would have separate sets of windings. The number of sets of apertures that can be provided as well as the arrangement of the apertures would depend on the material that is used and on the spacings between the control apertures and the signal and sense apertures.

An alternative embodiment is shown in FIG. 3. The element 60 is provided with apertures 61 and 62 which receive the signal and sense windings 63 and 64. The control windings 66 are threaded through apertures 67 and 68. The use of elongated apertures permits the use of a multiturn control winding and furthermore serves to minimize the amount of ferrite material. The use of an element of this type provides significant space savings and eliminates some of the shortcomings, such as warping or twisting due to the heat treatment, which are peculiar to the elongated element and which complicate the wiring and mounting of the element.

Figure 4:
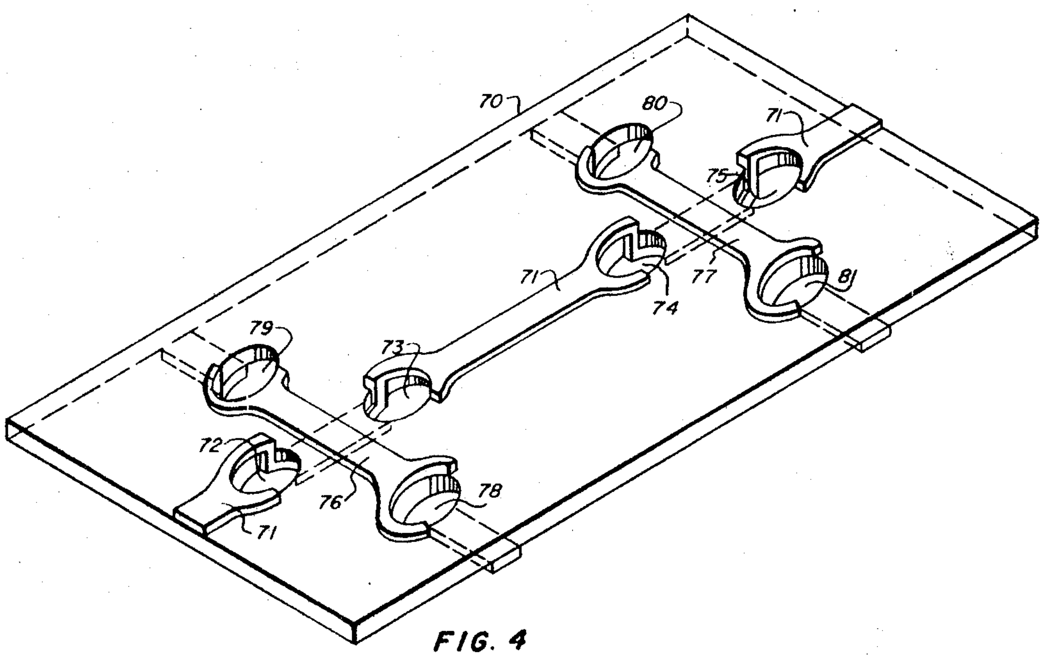
FIG. 4 shows an embodiment of the sensing element similar to that shown in FIG. 2, and including printed conductors.

Another embodiment of the invention, shown in FIG. 4, includes a magnetic element 70 having two groups of mutually perpendicular pairs of apertures 72–73, 78–79, and 74–75, 80–81, respectively. Each group of four apertures together with windings or loops associated therewith forms a complete gate circuit. The high resistivity property of the ferrite material permits printing of the windings on the element 70 and through the apertures. The conductors are printed on the ferrite using techniques known in the art. Signal winding 71 threads apertures 72, 73, 74, and 75 and a sense winding which has not been shown, in order to simplify the drawing, would thread the same apertures but in non-conducting relationship with the signal winding and the control winding. As can be seen in FIG. 4, conductor 71 is printed on the ferrite leaving sufficient unprinted area around the apertures 72,

73, 74, and 75 to permit a sense winding to be printed on the ferrite in isolated relationship with the signal winding 71, and would thread apertures 72–75 in a direction opposite to that of conductor 71 and so as to be isolated from the control windings 76, 77 at crossover points. In a similar manner, control windings 76 and 77 thread apertures 78, 79 and 80, 81 respectively. Appropriate connections are made between the printed windings and the telephone line circuit, the signal source and the detector. In the embodiment shown in FIG. 4, both the signal winding 71 and the sense windings would thread the apertures 72–75 of both groups. However, separate control windings 76–77 individually thread the other apertures 78–79, and 80–81, respectively, of the two groups of apertures, as shown.

The use of printed wiring techniques are effective in providing a compact device that eliminates the slow and inefficient wiring procedure that would be required when standard wiring techniques are used.

Referring again to FIG. 1, the magnetic sensing device 50 that has been described is advantageously employed in a telephone switching system to monitor the on-hook or off-hook status of a subscriber. Each subscriber in the system has a subset 20 which is extended to the central office by means of a pair of transmission line conductors 21 and 22 which terminate at terminals 23 and 24. These terminals provide access to a network 25 which supplies talking battery current to the subset.

The network 25 includes a pair of matched resistors (not shown) which are employed to guard against the undesired effects of signals induced on the telephone transmission lines. The single turn control windings which are serially connected to these resistors do not appreciably affect the degree of line balance obtained by the use of these resistors.

Sensing element 50 is serially connected between network 25 and the line conductors connected to the subset by means of a pair of control windings 41 and 42 which are extended, through the normally made contacts 31 and 32 of relay 30, to terminals 23 and 24, so that control current is directly dependent upon the action of the subscriber. The network 25 affords protection to the element 50 from disturbances that may be present on the transmission line due to lightning or line surges.

The control windings are threaded through apertures 53 and 54 so that the flux field created by line current flowing in the control windings will be concentrated in the portion of the magnetic element that lies between the apertures.

A signal from the signal source 43 is coupled to the detector 44 by means of signal winding 45 and sense winding 46 both of which are threaded through apertures 51 and 52. The windings are coupled together with the material in the vicinity of the apertures acting as the coupling medium.

The response characteristic of the sensing elements are such that whenever the subscriber lifts a handset, current, sufficient to saturate the portion of the magnetic sensing element encompasesd by the control windings, will be permitted to flow in the control windings. The saturation of element will effectively decouple the signal and sense windings.

The sense winding 46 is monitored so that the presence or absence of an output on this winding is indicative of the status of the subscriber. An indication from the detector 44 via common control 28 to switching network 29 that the subscriber requires service will cause the switching network to supply dial tone over the transmission line conductors 21 and 22 and to activate a relay 30 having a pair of normally closed contacts 31 and 32 connected so that upon operation of the relay, the magnetic sensing device is removed from the transmission lines.

The above described arrangements have been described with reference to preferred embodiments of the invention. It should be noted, however, that numerous alterations and modifications may be devised by those skilled in the art without departing from the spirit and scope of the invention.

What is claimed is:

1. In a telephone line circuit system including a line circuit, a signal source and a detector circuit; a magnetic sensing device for monitoring current flowing in said line circuit; said sensing device comprising:

a saturable magnetic element of a unitary piece of linear ferrite material having two mutually perpendicular pairs of apertures therein;

a first conductive loop connected to said signal source and wound on said element through one pair of said apertures and linking a first non-remanent flux path substantially wholly contained within said element;

a second conductive loop connected to said detector circuit and wound on said element through said one pair of said apertures and linking said first flux path, said second loop being coupled to said first loop with a portion of the ferrite element acting as the coupling medium, whenever said portion is unsaturated so that said signal source is coupled to said detector circuit; and a third conductive loop connected in said line circuit and wound on said element through the other pair of said apertures and linking a second non-remanent flux path substantially wholly contained within said element and traversing said portion, said portion of said element becoming saturated whenever current flows in said line circuit whereby said first loop is decoupled from said second loop and said signal source is decoupled from said detector circuit.

2. A sensing device in a telephone line circuit system as claimed in claim 1, wherein said magnetic element is elongated and has a plurality of groups of first and second pairs of mutually perpendicular apertures, a plurality of said first and said second conductive loops each threading one pair of apertures of each of said groups and a plurality of said third conductive loops each individually threading the other pair of apertures of said groups.

3. A sensing device in a telephone line circuit system as claimed in claim 1 wherein one of said pairs of apertures is disposed along the longitudinal axis of said element and the other one of said pairs of apertures is disposed along a line perpendicular to said longitudinal axis.

References Cited

UNITED STATES PATENTS

| | | | |
|---|---|---|---|
| 3,138,720 | 6/1964 | Glore | 179—18.3 |
| 2,911,631 | 11/1959 | Warren | 340—174 |

KATHLEEN H. CLAFFY, Primary Examiner

T. W. BROWN, Assistant Examiner

U.S. Cl. X.R.

340—174